(12) United States Patent
Sumida et al.

(10) Patent No.: US 7,040,685 B2
(45) Date of Patent: May 9, 2006

(54) SEAT STORING STRUCTURE FOR A VEHICLE

(75) Inventors: Kazue Sumida, Hiroshima (JP); Takashi Mizuma, Hiroshima (JP); Akira Ito, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/779,775

(22) Filed: Feb. 18, 2004

(65) Prior Publication Data

US 2004/0174038 A1    Sep. 9, 2004

(30) Foreign Application Priority Data

Mar. 3, 2003 (JP) .............................. 2003-055230
Mar. 3, 2003 (JP) .............................. 2003-055241
Mar. 3, 2003 (JP) .............................. 2003-055243

(51) Int. Cl.
B60N 2/30 (2006.01)

(52) U.S. Cl. .................. 296/69; 296/65.09; 297/403

(58) Field of Classification Search ............... 296/63, 296/64, 65.01, 66, 65.05, 65.16, 69; 297/15, 297/403
See application file for complete search history.

(56) References Cited

U.S. PATENT DOCUMENTS 2,652,101 A * 9/1953 Samsky et al. .............. 297/114
3,008,767 A * 11/1961 Fox ............................. 297/403
3,174,799 A    3/1965 Haltenberger
3,449,012 A * 6/1969 Caron .......................... 297/403
3,574,401 A * 4/1971 Lehner ..................... 297/452.46
5,269,581 A * 12/1993 Odagaki et al. ............... 296/66
5,669,668 A * 9/1997 Leuchtmann ................. 297/408
6,416,107 B1    7/2002 Kanaguchi et al.
6,499,787 B1 * 12/2002 Jach et al. ................. 296/65.09
6,568,736 B1 * 5/2003 Jach et al. ................. 296/65.09
6,705,658 B1 * 3/2004 Jach et al. ................. 296/65.09
6,709,040 B1 * 3/2004 Drew et al. .................... 296/66
6,793,265 B1 * 9/2004 Kamida et al. ................. 296/64
6,837,530 B1 * 1/2005 Rudberg et al. .......... 296/65.09
2001/0002759 A1 * 6/2001 Nishide .................... 296/65.09
2003/0006637 A1    1/2003 Jach et al.
2003/0184130 A1 * 10/2003 Kutomi et al. ................. 297/15
2003/0193206 A1 * 10/2003 Kutomi et al. ................. 296/66

FOREIGN PATENT DOCUMENTS

| DE | 40-29-605 A1 | 3/1992 |
| DE | 42-37-258 A1 | 5/1993 |
| JP | 11-198697 | 7/1999 |
| JP | 2001-63421 | 3/2001 |

* cited by examiner

OTHER PUBLICATIONS

Jun. 10, 2004 European Search Report for Application No. EP-04-00-4890.

*Primary Examiner*—Patricia L. Engle
(74) *Attorney, Agent, or Firm*—Nixon Peabody LLP; Donald R. Studebaker

(57) ABSTRACT

A third row seat of a vehicle includes a seat back which can be folded down onto a seat cushion, and a headrest which can be pivoted rearward with respect to the seat back. The seat cushion is mounted on the vehicle floor so as to be pivotable rearward. A recess is formed in the floor of the vehicle behind the third row seat. The recess stores the third row seat, with the seat back being folded down, the headrest being pivoted rearward, and the third row seat being pivoted rearward. The headrest is located within a path of the pivotal motion of the seat back and the seat cushion, without increasing the path of the pivotal motion.

2 Claims, 8 Drawing Sheets (a)

(b)

(c)

(a)

(b)

(Slanted up to the rearward)

(Horizontal)

SEAT STORING STRUCTURE FOR A VEHICLE

FIELD OF THE INVENTION

The present invention relates to a seat storing structure for a vehicle and, more particularly, to a structure for storing a seat in a recess provided in a floor of the vehicle located behind the seat.

DESCRIPTION OF THE RELATED ART

Conventionally, a seat storing structure for a vehicle is known as disclosed in Japanese Unexamined Patent Publications H11-198697 and 2001-63421 (equivalent to U.S. Pat. No. 6,416,107 B1). This structure arranges a plural row of seats within a passenger compartment in the vehicle's longitudinal direction. The rearmost seat can be stored in a recess provided in a floor portion behind the seat. With the seat stored in the recess, a planar surface is formed from where the seat is arranged towards the rear.

In the above-descried structure, however, due to the headrest constructed so as to recline forward with respect to the seat back, the overall length of the seat in the longitudinal direction of the vehicle is defined as: the total length measured from the headrest to the rear edge of the seat cushion or the seat back, when the seat is in the folded state. The seat, being in the aforementioned state, is pivoted rearward and stored in the recess in the floor. This requires the recess to be dimensioned to have at least the longitudinal length of the seat in the folded state and enlarges a space to be assured as a path of the pivotal motion of the seat. That is, in the above-described structure, the seat is stored in the recess, after: the headrest is reclined forward, the seat back is folded down forward, and the seat in the folded down state is pivoted rearward. Because of the relatively large longitudinal length of the seat in the folded state, this structure is inapplicable, as it is, to a small vehicle with a limited longitudinal length.

SUMMARY OF THE INVENTION

In view of the above problem, an object of the present invention is to make it possible in a vehicle being relatively short in its longitudinal length to realize a seat storing structure, in which the seat is stored in a recess, after the headrest is reclined, the seat back is folded down forward, and the seat in the folded down state is pivoted rearward.

According to the present invention, the object is achieved by a seat storing structure for a vehicle. The structure comprises a seat, a pivotally supporting mechanism for the seat, and a recess for storing the seat. The seat includes a seat cushion provided on a floor in a passenger compartment of the vehicle, a seat back supported in the vicinity of a rear portion of the seat cushion, and a headrest supported by the seat back. The seat is constructed so as to selectively attain a seating state where the seat back is erected in the vicinity of the rear portion of the seat cushion, or a folded state where the seat back is folded down forward onto the seat cushion. The pivotally supporting mechanism is provided between the seat and the floor for supporting the seat and pivoting rearward as the seat moves into the folded state. The recess is formed in the floor behind the seat, for storing the seat such that a lower surface of the seat cushion is substantial alignment with the floor after the overall seat in the folded state has been pivoted rearward. The headrest is supported by the seat back so as to shift between a first state where the headrest is located at the top of the seat back with the seat in the seating state, and a second state where the headrest is located on a back surface of the seat back and at the inside of paths of the pivotal motions of the seat back and seat cushion with the seat in the folded state.

According to the above constitution, the dimension of the headrest has no effect on the longitudinal length of the seat or the headrest does not protrude out of the path of the pivotal motion of the seat cushion or the seat back, when the seat is in the folded state and the headrest is in the second state. This shortens the longitudinal length of the recess formed in the floor in the passenger compartment behind the seat for storing the seat, and downsizes the space as the path of the pivotal motion of the seat, thereby allowing a vehicle with a limited overall length to realize a structure of storing the folded seat in the recess formed behind the seat.

Preferably, the outer periphery of the path the pivotal motion of the seat cushion and the outer periphery of the path of the pivotal motion of the seat back may be substantially identical to each other during the rearward pivotal motion of the seat, with the seat being in the folded state and the headrest being in the second state.

In the case that the longitudinal length is severely limited in the vehicle, the above-mentioned structure, in which the headrest does not contribute to the path of the pivotal motion of the seat, may be insufficient. This is because, due to the fact that seat back pivots together with the seat cushion while being folded down onto the seat cushion, additional modifications should be made to the paths of the pivotal motions of the seat back and the seat cushion. That is, in order to avoid interference between the recess and the seat, the recess can be necessarily dimensioned for the larger of the paths drawn by the pivotal motions of the seat back and the seat cushion. In this case, however, an unnecessary space (a so-called dead space) would be left in the recess when the seat has been stored therein. In seeking a more favorable storage of the seat without such a dead space and the reduced back and forth length of the recess, a new problem of the dead space is encountered additionally.

According to the constitution in which the outer periphery of the paths are substantially identical to each other, the recess for storing the seat is further reduced in size. Particularly, the outer periphery of the path of the pivotal motion of the seat cushion and the outer periphery of the path of the pivotal motion of the seat back are identical to each other, so that no unnecessary space is left when the seat is stored in the recess.

More specifically, an upper and rear edge of the recess may be substantially on the outer periphery of the path drawn by the pivotal motion of the seat cushion and the outer periphery of the path drawn by the pivotal motion of the seat back.

Accordingly, the upper and rear edge of the recess is substantially on the outer periphery of the path drawn by the pivotal motion of the seat cushion and the outer periphery of the path drawn by the pivotal motion of the seat back. That is, the seat is fitted in the recess with little or no clearance between the rear edge of the seat and the upper and rear edge of the recess. Accordingly, the recess has the minimum longitudinal length necessary to store the seat, while accommodating the paths of the pivotal motions of the seat cushion and the seat back, thereby shortening the longitudinal length requirements of the vehicle.

Further preferably, the pivotally supporting mechanism may include a pivotal axis at which the seat is pivotally supported, and support the seat so as to locate the rear edge of the seat in the seating state at a portion rearward of the front edge of the recess; and the pivotal axis may be located between the rear edge of the seat and the front edge of the recess with respect to a longitudinal direction of the vehicle.

According to the above constitution, with the seat in the seating state, the rear portion of the seat cushion and the front portion of the recess overlap with each other and the pivotal axis of the seat is located between the rear edge of the seat and the front edge of the recess in the back and forth direction of the vehicle. Accordingly, a structure for storing the folded seat in the recess formed behind the seat is realized while the longitudinal length of the vehicle is shortened by the overlapping length of the seat and the recess.

Still further preferably, the back surface of the seat back may be formed with a depression which accommodates the headrest in the second state.

Thus, with the seat in the folded state and the headrest in the second state, the volume occupied by the seat cushion, seat back, and the headrest is reduced by the volume of the depression. Accordingly, the recess formed in the floor for storing the seat is reduced in size with the thickness of the headrest ensured.

Still further, the headrest may be in contact with both the seat back and a bottom surface of the recess within a space defined between the seat back and the bottom surface of the recess when the seat has been stored in the recess.

Also, the headrest is in contact with both the bottom surface of the recess and the seat back, thereby preventing instability in or the unwanted movement of the lower surface of the seat when the seat is stored in the recess. Further, instability and movement is prevented even in if, due to the design factors of the vehicle, a space is left between the bottom surface of the recess and the seat back, when the seat is stored. For example, a space may be left between the bottom surface of the recess and the seat back, when stored, due to the layout of the pivotally supporting mechanism or the like when the bottom of the recess is designed for improved utility as a luggage compartment. Thus, the present invention promotes stability and prevents the unwanted movement of the lower surface of the seat cushion when the seat is stored, thereby forming a stable floor surface constituted by the lower surface of the seat cushion.

Still further, the vehicle may include an opening portion formed behind the seat and a hatch door for opening and closing the opening portion. Also, the pivotally supporting mechanism, seat cushion, and seat back may be configured such that the seat causes no interference with the hatch door being closed while the seat in the folded state is being pivoted rearward.

Also, with the hatch door closed, the seat, in the folded state, can be stored in the recess after the rearward pivotal motion of the seat, thereby allowing a passenger of the vehicle to store the seat in a passenger compartment of the vehicle, even when the hatch door is closed. Additionally, when the seat has been stored in the recess, the lower surface of the seat cushion and the floor of the vehicle are in substantial alignment with each other, thus enabling easy loading/unloading of luggage through the opening portion of the vehicle when the hatch door is opened with the seat being stored.

According to the preferred embodiment of the present invention, the present invention enables the seat to have no interference with the hatch door. The distance between the pivotal axis and the inboard surface of the hatch door is longer than the distance between the pivotal axis and the outer periphery of the path drawn by the pivotal motion of the seat cushion, and longer than the distance between the pivotal axis and the outer periphery of the path drawn by the pivotal motion of the seat back when the seat is in the folded state.

In order to realize the above-mentioned seat storing structure in a vehicle with a limited longitudinal length, it is effective that the recess is located as forward as possible. However, beneath the floor of the vehicle, a silencer is usually mounted.

In the case where a silencer is provided beneath the floor, the silencer may preferably have an elliptic-cylindrical shape and be disposed in front of the recess so that its longitudinal direction is oriented substantially in the transverse direction of the vehicle and the major axis of an ellipsoid as its cross-section is oriented substantially in the vertical direction of the vehicle.

According to the above constitution, the longitudinal length of the silencer having been mounted on the vehicle is shortened without any sacrifice of the capacity of the silencer, because the silencer, having an elliptic-cylindrical shape, is disposed in front of the recess for storing the seat such that its longitudinal direction is oriented substantially in the width direction of the vehicle and the major axis of an ellipsoid as its cross-section is oriented substantially in the vertical direction of the vehicle. Accordingly, the recess is put forward by the shortened length, thereby realizing a structure of storing the seat in the recess formed behind the seat after the seat back is folded forward onto the seat cushion and the seat is pivoted rearward, even in a vehicle with a limited overall length.

Still further preferably, the floor may be slanted such that its rear portion is situated higher than its front portion.

Furthermore, the lower surface of the seat cushion is in substantial alignment with the floor, slanted such that its rear portion is situated higher than its front portion, when the seat has been pivoted rearward to be stored in the recess. In this state, the pivotal angle of the seat is smaller than the case with the lower surface of the seat cushion being substantially horizontal, so that the front edge of the seat in the stored state is correspondingly located rearward. This expands the space in front of the recess, thereby enabling the silencer or other components to be additionally disposed within the space. That is, a flat surface is formed over the portion where the seat is disposed and rearward thereof while the silencer or other components is easily placed in front of the recess. Moreover, in the case that an opening portion to be opened and closed is formed at the rear end of the vehicle and a so-called "step-less" floor configuration is formed in which the lower edge of the opening portion and the floor are at substantially the same height, the rear end of the floor is located relatively high, thereby downsizing the opening portion and a door that opens/closes the opening portion.

Other features, aspects, and advantages of the present invention will become apparent from the following description of the invention which refer to the accompanying drawings.

DETAILED DESCRIPTION OF THE INVENTION

An exemplary embodiment of the present invention will now be described with reference to the FIG. 1 to FIG. 8.

Figure 1:
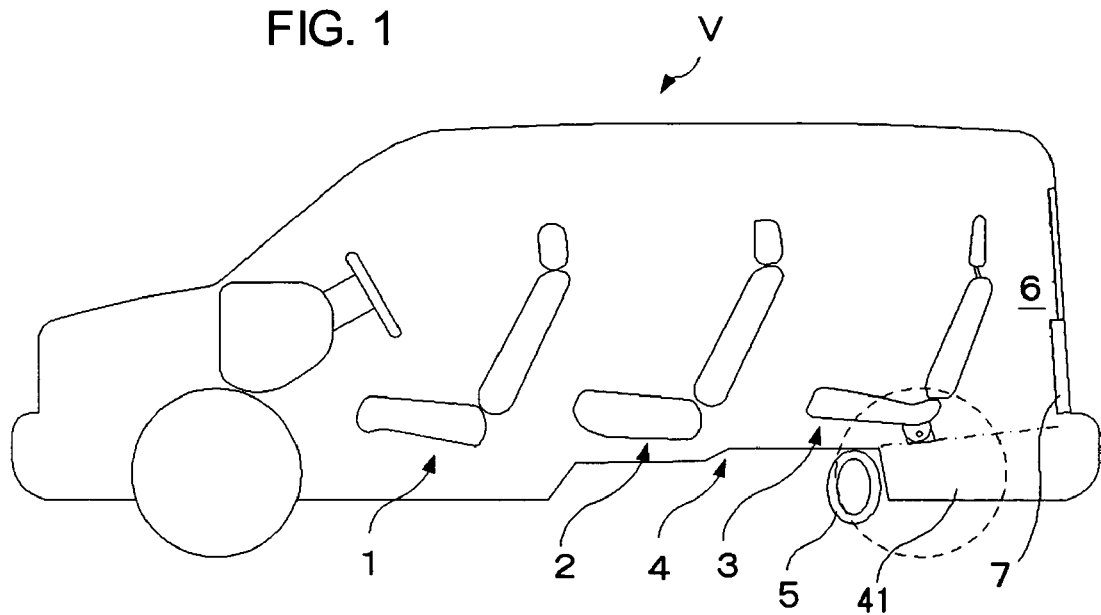
FIG. 1 is a schematic side view of a vehicle to which a seat storing structure in accordance with the present invention is applied.
Figure 2:
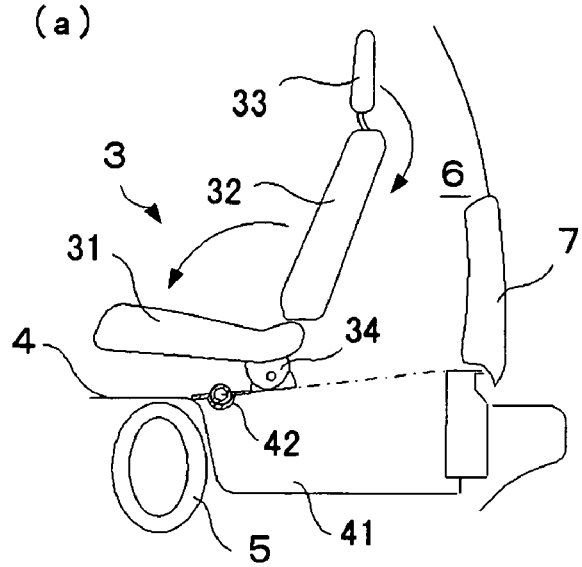
FIG. 2 is enlarged schematic side views of: (a) a third row of seat 3 in a seating state; (b) a third row seat in a folded state; and (c) a third row seat in a stored state, respectively.
Figure 2:
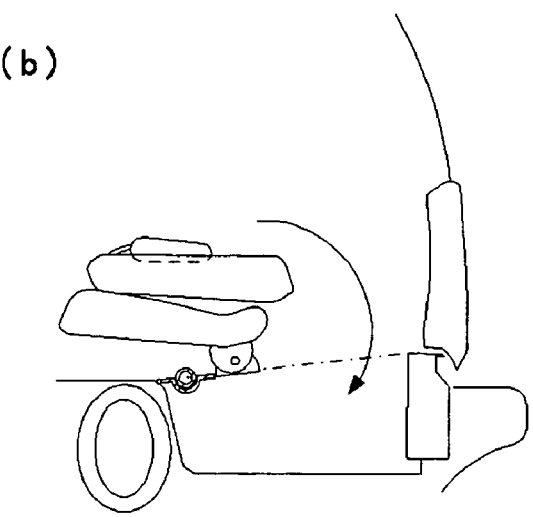
Figure 2:
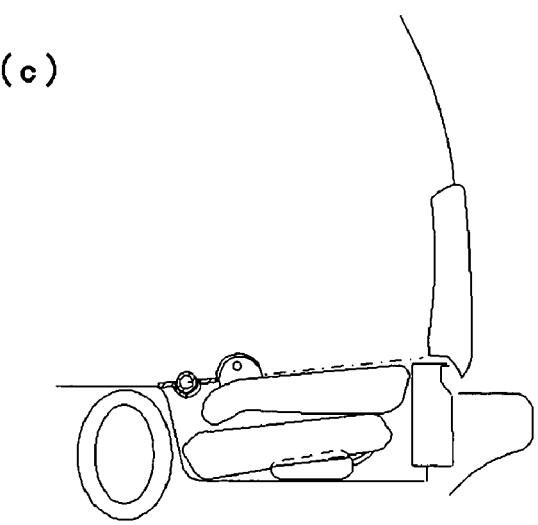
Figure 3:
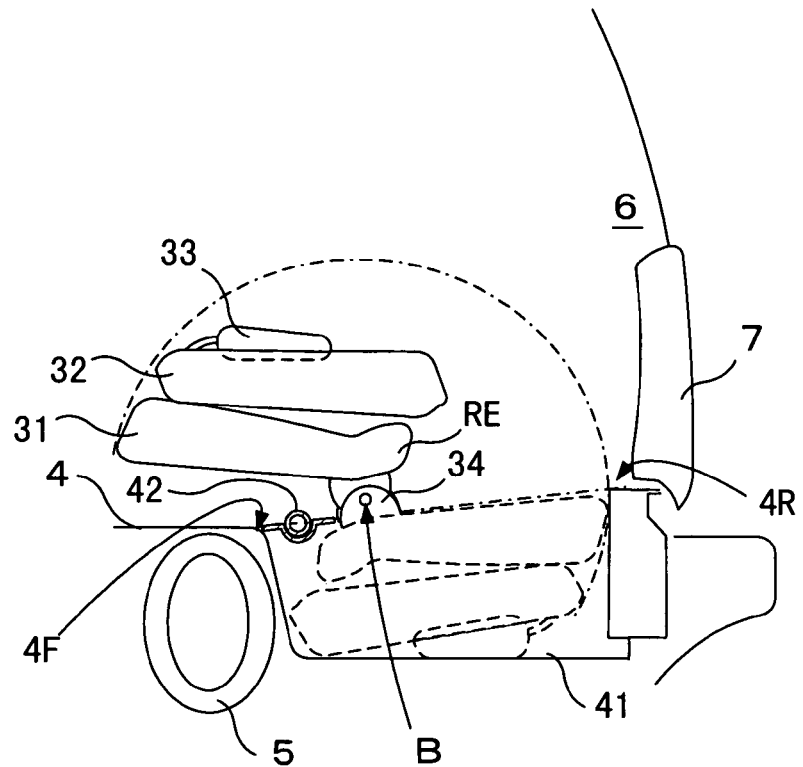
FIG. 3(a) is a side view showing the pivotal motion of the third row seat.
FIG. 3(b) is a comparative diagram of the configurations of: the seat with the lower surface of the seat cushion being horizontal; and the seat with the lower surface of the seat cushion being slanted up to the rearward, for the seat in the stored state.
Figure 3:
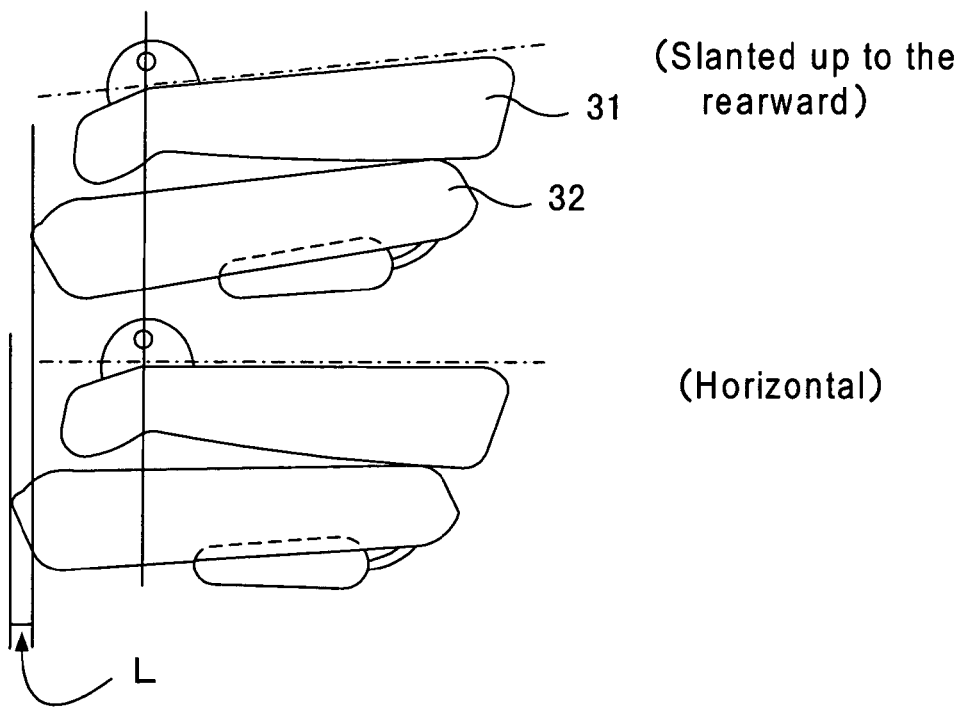

FIG. 1 schematically shows a side view of a vehicle V to which a seat string structure in accordance with an exemplary embodiment of the present invention is applied. In a passenger compartment of the vehicle V, three rows of seats 1, 2, and 3 are arranged in the traveling direction of the vehicle V. The first row seat 1, being disposed at a front portion of the passenger compartment, defines a driver seat and a front passenger seat (FIG. 1 shows one of the seats). The second row seat 2, being constructed as a so-called "bench seat," is disposed behind the first row seat 1. The third row seat 3, being constructed as a bench seat as well, is disposed behind the second row seat 2. The driver seat and front passenger seat constituting the first row seat 1 are conventional in structure including a seat cushion, seat back, and headrest. However, for the second row seat 2 and third row seat 3 in the bench seat configuration, a plurality of headrests are arranged on their seat backs along the longitudinal direction of each seat correspondingly in position of the seating positions of passengers. The third row seat 3, which is stored as will be described later, is shown being in a seating state where a passenger can be seated therein.

A recess 41 is formed in a floor 4 of the vehicle V at the portion where the third row seat 3 is disposed and rearward thereof. The recess 41 stores the third row seat 3, as will be described later. At the rear end of the vehicle V behind the recess 41, an opening portion 6 is formed which can be opened/closed by a hatch door 7 supported by the upper edge of the opening portion 6 via a hinge not shown. The hatch door 7, when closing the opening portion 6, defines the rear end of the passenger compartment. In front of the recess 41, particularly in front of a front wall of the recess 41 in the bottom surface of the floor 4 of the vehicle V, a silencer 5 is disposed as will be described.

Structures of the third row seat 3, the recess 41, a mechanism for storing the third row seat 3 in the recess 41, and a portion of the vehicle V where the third row seat 3 is disposed, will now be described in detail with reference to FIGS. 2(a) to (c) showing an enlarged view of a portion of the vehicle V where the third row seat 3 is disposed. Because the identical components are shown in FIGS. 2(a) to (c), reference numerals are given to only FIG. 2(a), omitted in FIGS. 2(b) and (c).

The third row seat 3 can accommodate three states which include: a state shown in FIG. 2(a); a state shown in FIG. 2(b); and a state shown in FIG. (c). Particularly, in the seated state shown in FIG. 2(a), a seat cushion 31 is substantially horizontally supported by the floor 4 of the vehicle V via a front supporting mechanism (not shown) provided at a front portion of the lower surface of the seat cushion 31 and a rear supporting mechanism 34 provided at a rear portion of the lower surface of the seat cushion 31. A seat back 32 is supported by the seat cushion 31 so as to be erected in the vicinity of the rear edge of the seat cushion 31. A headrest 33 is supported by the top portion of the seat back 32. In this state, two passengers can be seated in the third row seat 3. In the folded state shown in FIG. 2(b), the seat cushion 31 is substantially horizontally supported as in the seating state. The seat back 32 has been folded forward onto the seat cushion 31 to be fixed with respect to the seat cushion 31 from the state shown in FIG. 2(a), and the headrest 33 has been pivoted rearward onto the back surface of the seat back 32 to be fixed with respect to the back surface of the seat back 32. The structure for folding down onto and fixing to the seat cushion 31 may be embodied by use of conventional seat-folding mechanisms. The structure for pivoting rearward and locating the headrest 33 on the back surface of the seat back 32 will be described later in detail. In the stored state shown in FIG. 2(c), the third row seat 3 in the folded state has been pivoted rearward from the state shown in FIG. 2(b) and stored in the recess 41 formed in the floor 4 of the vehicle V behind the third row seat 3. As will be described later in detail, the mechanism for pivoting the third row seat 3 into the stored state may be embodied by use of conventional locking mechanism and strikers configured to allow the front supporting mechanism to be selectively locked or released, and the rear supporting structure 34 constructed so as to pivotally support the seat cushion 31 about a pivotal axis, wherein the third row seat 3 in the folded state is pivoted rearward about the pivotal axis of the rear supporting structure 34 with the front supporting structure being released. The seat back and headrest can be fixed in their folded state via conventional locking mechanism or the like, allowing the third row seat 3 to be easily brought into stored state shown in FIG. 2(c) from the folded state shown in FIG. 2(b).

The recess 41 formed in the floor 4 of the vehicle V behind the third row seat 3 is dimensioned so as to store the third row seat 3 in the folded state. With the third row seat 3 in the folded state being stored in the recess 41, substantially little or no clearance is left between the floor 4 and the third row seat 3 on the upper surface of the floor 4. Thus, as shown in FIG. 2(c), with the third row seat 3 in the stored state, the lower surface of the seat cushion 31 is in alignment with the floor surface, constituting a continuous bottom surface that is substantially planar. When the seat back 31 is reversed, a small space is left in front of the lower surface of the seat back 31. However, over the space, a cross member 42 such as a bar or pipe laterally extends across the width of the vehicle V for fixing a seat belt (not shown), which constitutes the continuous surface in cooperation with the floor 4 in front of the recess 41 and the lower surface of the seat cushion 31. The floor 4 is tilted such that its rear portion is situated higher than its front portion. Correspondingly, when the third row seat 3 is in the stored state, the lower surface of the seat cushion 31 is tilted such that its rear portion is situated higher than its front portion. The rear edge of the floor 4 corresponds in height to the lower edge of the opening portion 6 formed at the rear end of the vehicle V, thereby constituting a so-called. "step-less" floor configuration, in which the lower edge of the opening portion 6 and the floor are at substantially the same height. In the stored state, the headrest 33 is located between the bottom surface of the recess 41 and the seat back 32. In this state, the headrest is in contact with the bottom surface of the recess 41, thereby preventing unwanted movement of the surface constituted by the lower surface of the seat cushion 31 in alignment with the floor 4, when the third row seat 3 is in the stored state.

The silencer 5, with an elliptic-cylindrical shape, is disposed beneath the floor 4 of the vehicle V and in front of the recess 41 such that its longitudinal direction is oriented substantially in the width direction of the vehicle V and the major axis of an ellipsoid as its cross-section is oriented substantially in the vertical direction of the vehicle V. This shape and layout of the silencer 5 shortens its length along the longitudinal direction of the vehicle V when the silencer 5 is mounted on the vehicle V, with sufficient capacity of the silencer 5 being assured. Accordingly, the recess 41 is placed forward, contributing to the shorter longitudinal length of the vehicle V. Some vehicles V may replace the silencer 5 with other components such as a fuel tank. In any case, however, beneath the floor 4 of the vehicle V and in front of the recess 41, components such as the silencer 5 or the fuel tank can be additionally mounted.

In the structure for storing the third row seat 3 in accordance with the present invention, for the purpose of realizing the above-described seat storing structure even in a short vehicle in its longitudinal direction, modifications have been made with regard to the physical relationship between the third row seat 3 and the recess 41, the location of the rear supporting mechanism for pivotally supporting the third row seat 3, and the path drawn by the pivotal motion of the third row seat 3. The modifications will now be described with reference to FIG. 3(a) and FIG. 3(b) of side views showing the pivotal motion of the third row seat 3. In FIG. 3(a), indicated by solid lines is the third row seat 3 in the folded state; indicated by broken lines is the third row seat 3 in the stored state.

Before the pivotal motion, the rear edge of the third row seat 3, that is, the rear edge RE of the seat cushion 31 is located behind a front edge 4F of the recess 41 in the longitudinal direction of the vehicle V, with the third row seat 3 and the recess 41 partly overlapping with each other in the longitudinal direction of the vehicle V. Accordingly, the overlap contributes to the shorter overall length of the vehicle V, though depending on the size of the third row seat 3 and the layout of other components of the vehicle V.

The rear supporting mechanism 34, which supports the third row seat 3 for the rearward pivotal motion, is disposed between the rear edge RE of the seat cushion 31 and the front edge 4F of the recess 41 in the longitudinal direction of the vehicle V. Particularly, on both lateral sides of the recess 41 in the floor 4, the rear supporting mechanisms 34 are provided in pair which pivotally support the seat cushion 31 via brackets (not shown) at the rear portions on both the lateral sides. A pivotal portion, that is, the pivotal center is located between the rear edge RE of the seat cushion 31 and the front edge 4F of the recess 41 with respect to the longitudinal direction of the vehicle V before the pivotal motion of the seat. As apparent from FIG. 3, when the third row seat 3 is in the folded state prior to the pivotal motion, the rear edge RE of the third row seat 3 is located behind the pivotal center of the rear supporting mechanism 34. When the third row seat 3 has been pivoted rearward into the stored state in the recess 41, the rear edge RE is shifted forward to a position in front of the pivotal center. At that time, the rear edge RE of the seat 3 abuts the front wall of the recess 41. This construction of the rear supporting mechanism 34 allows the third row seat 3 to be stored in the recess 41 after the rearward pivotal motion of the third row seat 3, even with the above-described overlap between the third row seat 3 and the recess 41 in the longitudinal direction of the vehicle V.

In addition, as indicated by dash-dotted lines in FIG. 3(a), with regard to the outer periphery of the path drawn by the rearward pivotal motion of the third row seat 3 from its folded state, the outer periphery of the path drawn by the pivotal motion of the seat cushion 31 and the outer periphery of the path drawn by the pivotal motion of the seat back 32 are substantially geometrically identical to each other and the outer peripheries of the paths correspond in position to an upper rear edge 4R of the recess 41. Moreover, when the third row seat 3 has been in the folded state and the headrest 33 has been pivoted rearward into contact with the back surface of the seat back 32, the motion of headrest 33 is limited to be within the path of the pivotal motion described above (a supporting structure for achieving this pivotal motion of the headrest will be described later). Accordingly, the headrest 33 has no effect on the path of the pivotal motion of the third row seat 3 in the folded state. In other words, the headrest 33 does not constitute the outer periphery of the path, which thereby shortens the longitudinal length of the recess 41. Additionally, because the outer periphery of the path drawn by the pivotal motion of the seat cushion 31 and the outer periphery of the path drawn by the pivotal motion of the seat back 32 are substantially geometrically identical to each other as described above, the opposite end of the seat cushion 31 with respect to the pivotal center and the opposite end of the seat back 32 with respect to the pivotal center also move along substantially the same path when the third row seat 3 is stored in the recess 41. If one outer periphery of the path of the pivotal motion were on the outside of the other, the recess 41 would have to be dimensioned for the one with the larger path, which may adversely leave undesired dead space in the recess 41 when the third row seat 3 is stored therein. However, as described above, by dimensioning the outer peripheries of the paths drawn by the pivotal motions of the seat cushion 31 and the seat back 32 to be substantially identical to each other, the dead space in the recess 41, left when the third row seat 3 is stored therein, is minimized. This contributes to the minimization of the recess 41.

The distance between the pivotal center and the inboard surface of the hatch door 7 is longer than the distance between the pivotal center and the outer periphery of the path drawn by the pivotal motion of the third row seat 3, without the interference between the hatch door 7 and the third row seat 3 during the pivotal motion of the third row seat 3. This allows a passenger to store the third row seat 3 in the recess 41 at the rear portion in the passenger compartment of the vehicle V even with the hatch door 7 closed.

Additionally, as described above, the rear portion of the floor 4 behind the third row seat 3 is situated higher than its front portion. Correspondingly, when the third row seat 3 is in the stored state, the lower surface of the seat cushion 31 is tilted such that its rear portion is situated higher than its front portion. That is, when the third row seat 3 is in the stored state, the third row seat 3 is pivoted to a state where the lower surface of the seat cushion 31 of the third row seat 3 is at an angle with the horizontal level about the pivoting portion B as the pivotal center, not pivoted up to a state where the lower surface of the seat cushion 31 is horizontal. This locates the front edge of the third row seat 3 in the stored state at a position rearward of the front edge of the third row seat 3 in the horizontal state. As described above, the silencer 5 is mounted in front of the recess 41. However, as shown in FIG. 3(b), the front portion of the third row seat 3 in the stored state is located at a position rearward of the front portion of the third row seat 3 in the horizontal state, so that the front edge of the seat back 32 is located rearward by the length L. The front edge 4F of the recess 41 is correspondingly positioned rearward, thereby easing in the layout of the silencer 5 or the enlarging the capacity of the silencer 5. Thus, the structure is realized which allows the third row seat 3 to be stored by folding and pivoting rearward the third row seat 3, with the minimum restriction to the layout and size of the components such as the silencer 5 to be mounted beneath the floor 4 of the vehicle V. Additionally, in the case that a so-called step-less floor configuration is constituted, the rear edge of the floor 4 is located relatively upward because the floor 4 is tilted such that its rear portion is situated higher than its front portion. This reduces the size of the opening portion 6 and the hatch door 7 provided at the rear end of the vehicle V.

A supporting mechanism for the headrest 33 will now be described with reference to FIG. 4 to FIG. 7.

Figure 4:
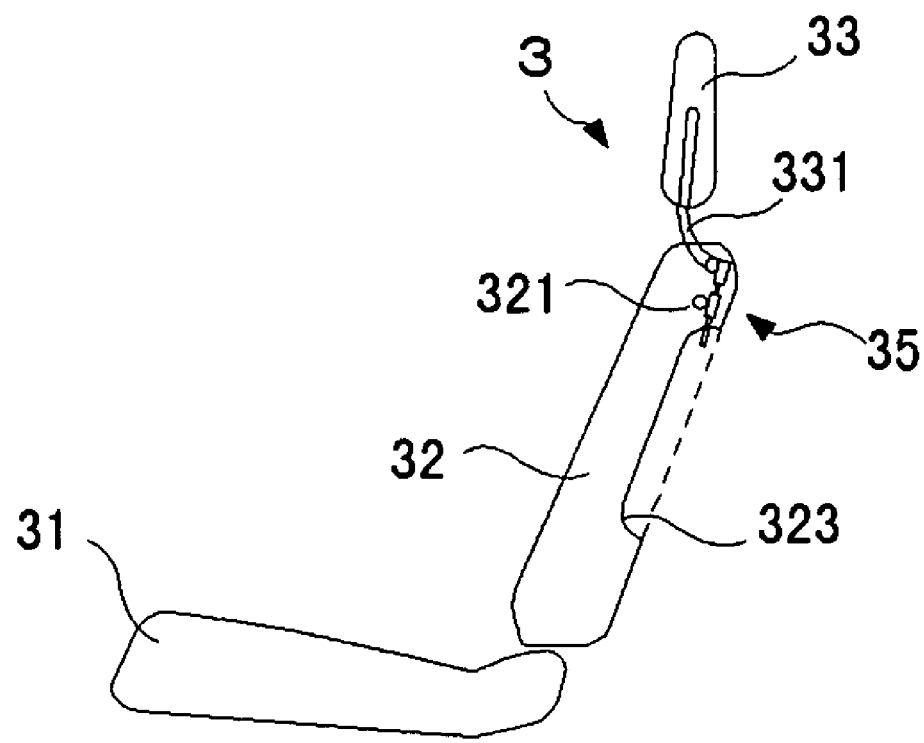
FIG. 4 is a side view of a supporting mechanism for a headrest with a third row seat 3 in a seating state.

FIG. 4 schematically shows a side view of the supporting mechanism 35 for the headrest 33 with the third row seat 3 in seating state. The headrest 33, with the third row seat 3 in the seating state, is supported by the supporting mechanism 35 at the top portion of the seat back 32. The supporting mechanism 35, provided between a seat back frame 321 and a headrest frame 331 at the inside and upper portion of the seat back 32, supports the headrest 33 so as to allow the headrest 33 to shift between a state where the headrest 33 is supported at the top of the seat back 32 (referred to as a first state) and a state where the headrest 33 has been pivoted rearward with respect to the third row seat 3 into contact with the back surface of the seat back 32 (referred to as a second state). In the back surface of the seat back 32, a depression 323 is formed for accommodating the headrest 33 in the second state.

Figure 5:
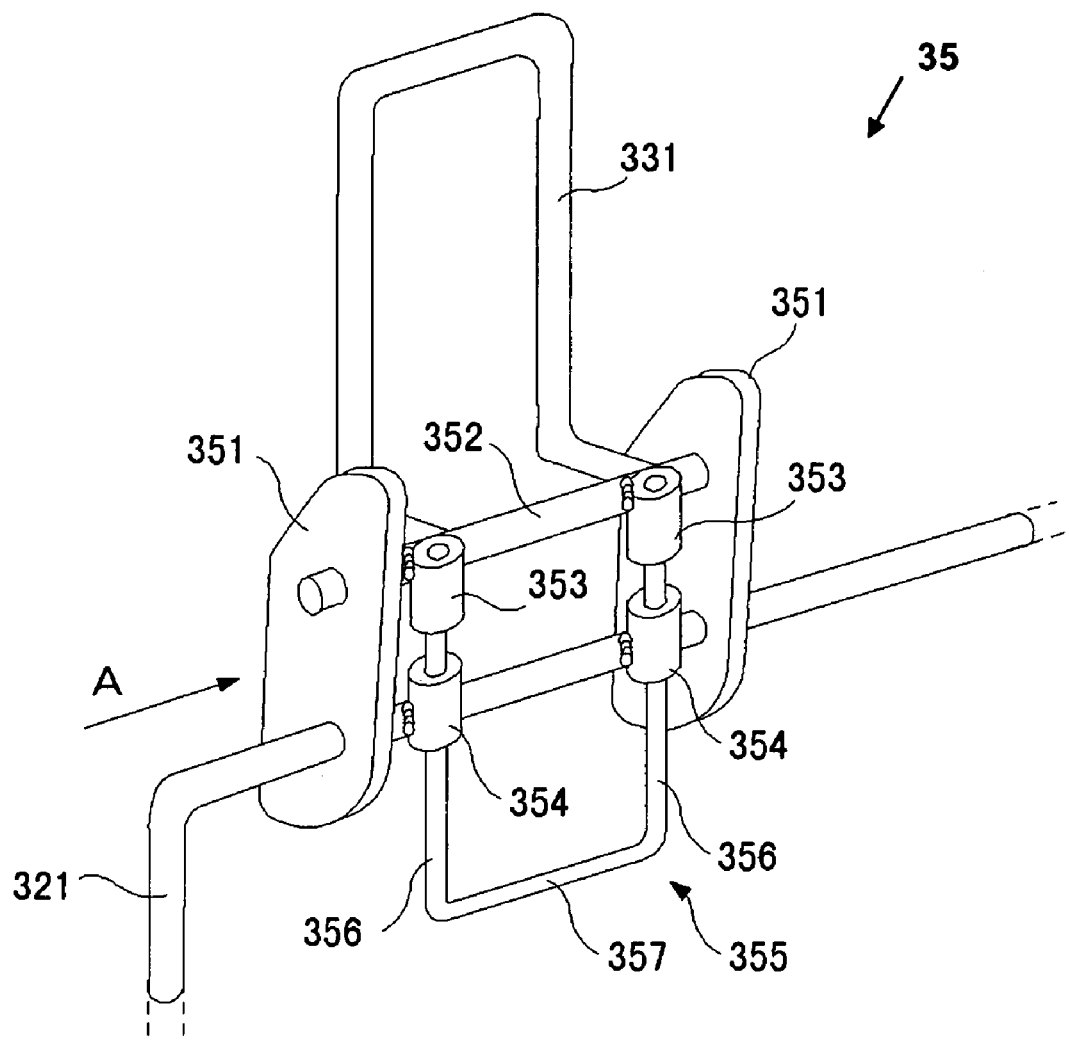
FIG. 5 is a perspective view showing a headrest in a first state when view from rearward, with a headrest cushion and a seat back cushion omitted.

Particularly, as shown in FIG. 5 showing, a perspective view of the headrest 33 in the first state when viewed from the rear, the supporting mechanism 35 comprises: a pair of brackets 351, a pipe 352, a pair of seat back sleeves 354, a pair of headrest sleeves 353, and a rod 355. The brackets 351 are welded to the seat back frame 321. The pipe 352 is supported by the brackets 351 pivotally about its longitudinal axis. The seat back sleeves 354 are welded to the seat back frame 321. The headrest sleeves 353 are welded to the pipe 352. The rod 355 has a substantial U-shape comprising two straight insertions 356 to be inserted in the pair of the seat back sleeves 354 and the pair of the headrest sleeves 353, and a connection 357 connecting the lower end of the insertions 356. A spring (not shown) is provided in the seat back sleeve 354 for biasing the insertion 356 or the rod 355 upward. The pipe 352 is also welded to the headrest frame 331 so that the rotation of the headrest frame 331 causes the headrest sleeve 353 to rotate together. The supporting mechanism 35 in the above construction is provided in a cushion body of the seat back 21. FIG. 5 omits the cushion body.

In a state shown in FIG. 5, or when the headrest 33 is in the first state, the insertions 356 of the rod 355 are inserted in both the seat back sleeves 354 and the headrest sleeves 353 to lock the headrest sleeve 353, thereby restricting the rotation of the pipe 352 or the headrest frame 331. On the other hand, with the rod 355 pulled downward, the insertions 356 are displaced downward out of the engagement with the headrest sleeves 353, allowing the headrest frame 331 to be freely rotated. Then, the headrest 33 can be shifted to the second state.

Figure 6:
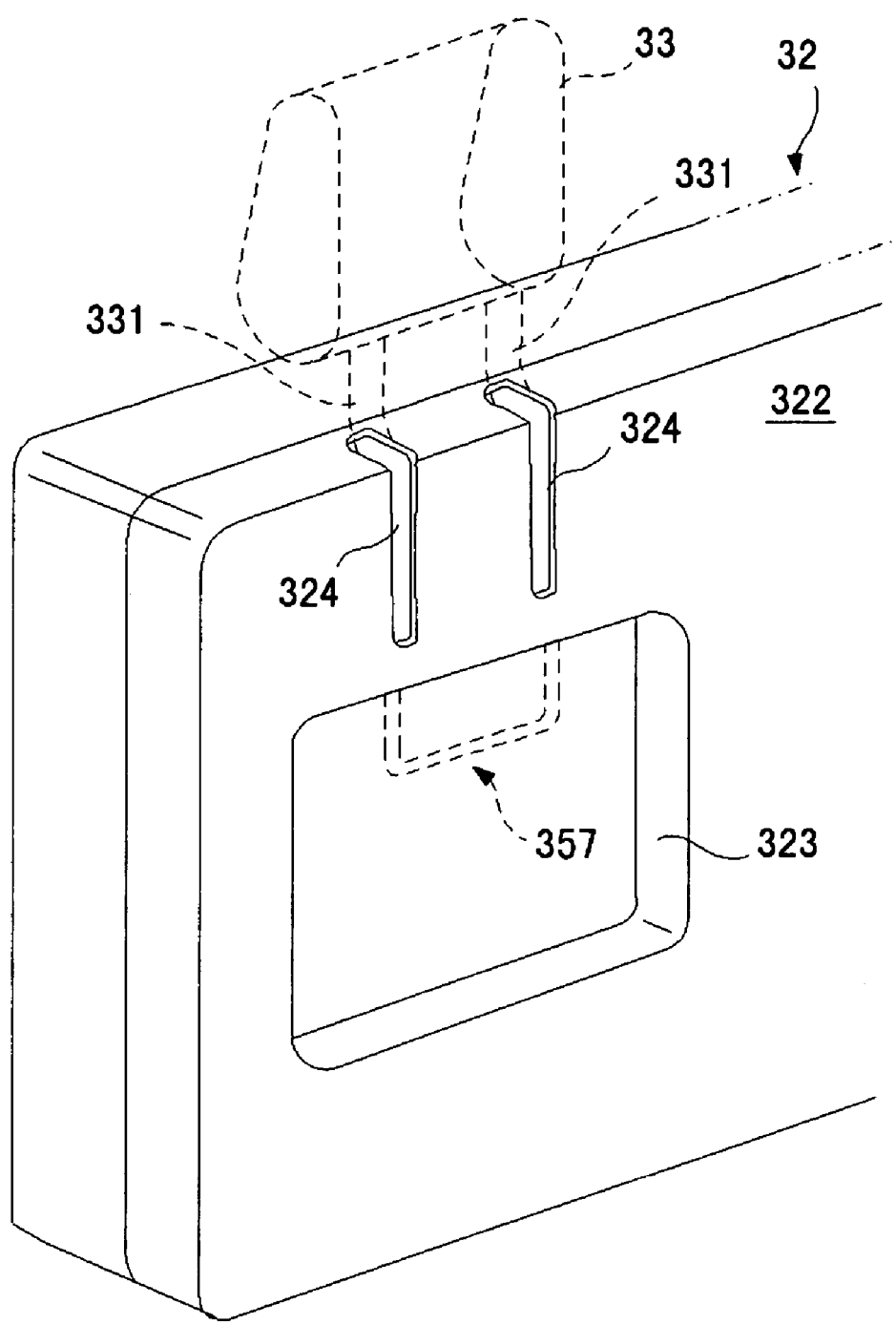
FIG. 6 is a perspective view of a seat back when viewed from rearward.

In a trim 322 covering the seat back 32 and its back surface, as shown in FIG. 6 depicting a perspective view of the trim 322 when viewed from the rear, cutaway portions 324 are formed geometrically corresponding to the path drawn by the motion of the headrest frame 331, for allowing the headrest 33 to shift between the first state and the second state. As described above, the trim 322 is formed with the depression 323 which accommodates the headrest 33 when the headrest 33 has been pivoted rearward. On the upper surface of the depression 323, the connection 357 of the rod 355 is exposed, allowing the pull-down operation of the connection 357 for rotating the headrest 33 rearward. FIG. 6 depicts the headrest 33, headrest frame 331, and connection 357 in broken lines.

Figure 7:
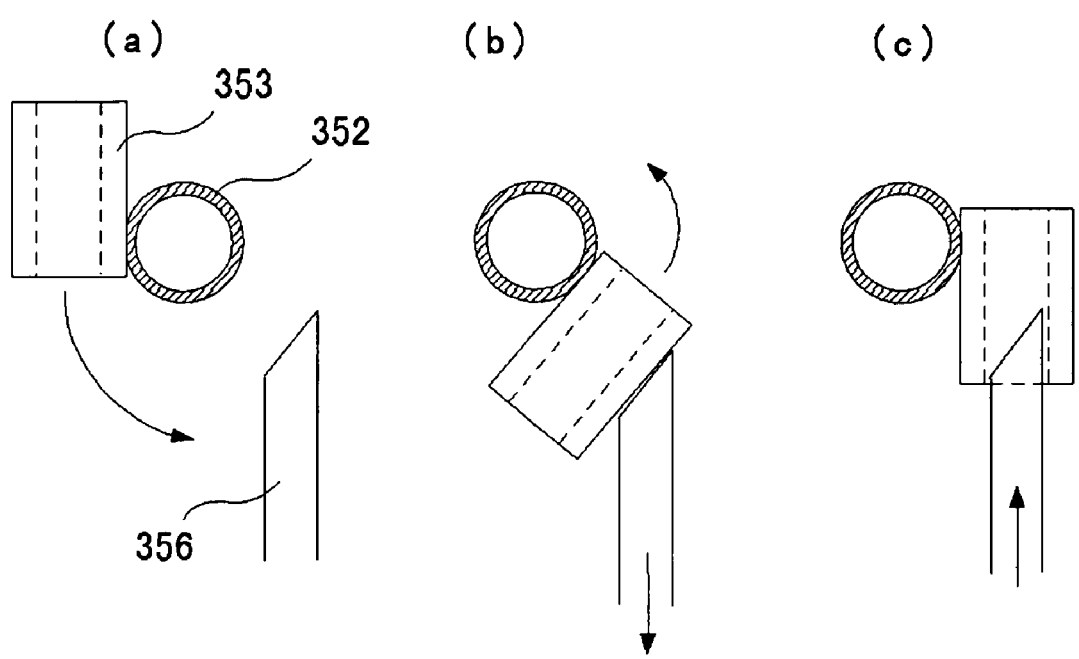
FIG. 7 is a schematic side view of a pipe, insertion, and headrest sleeve when viewed in the direction of the arrow A in the FIG. 5.
Figure 8:
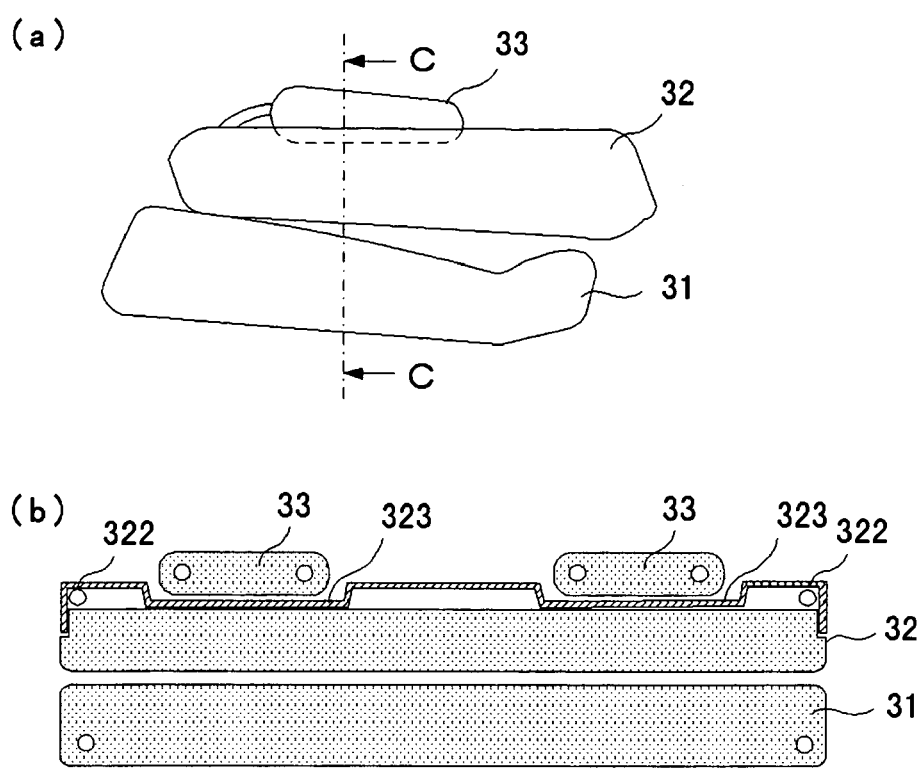
FIG. 8(a) is a side view of a third row seat in a folded state.
FIG. 8(b) is a cross-sectional view taken along the line C—C in FIG. 8(a).

FIG. 7 schematically shows a side view of the pipe 352, insertion 356, and headrest sleeve 353 when viewed in the direction of the arrow A in the FIG. 5. As shown, the upper end surface of the insertion 356 is cut diagonally toward the front. This shape eliminates the need for the pull-down operation of the rod 355 when the headrest 33 is to be returned from the second state to the first state. That is, as shown in FIG. 7(a), with the headrest 33 in the second state, the headrest sleeve 353 has been rotated about the pipe 352 up to a position opposite to the insertion 356. In returning the headrest 33 from the second state to the first state, as shown in FIG. 7(b), the headrest sleeve 353 rotates counterclockwise. As the sleeve 353 rotates, the end portion and side portion of the headrest sleeve 353 push down the insertion 356 with the headrest sleeve 353 being in contact with the slanted surface at the upper end of the insertion 356 in front thereof. Then, as shown in FIG. 7(c), when the axis of the headrest sleeve 353 is eventually brought into alignment with the axis of the insertion 356, the insertion 356 of the rod 355, biased upward, is inserted into the headrest sleeve 353 to lock the headrest 33 in the first state.

Thus, when the seat back 32 of the third row seat 3 has been folded forward and the headrest 33 has been rotated rearward (in the folded state of the third row seat 3), the seat cushion 31, seat back 32, and headrest 33 are horizontally stacked as shown in FIG. 8(a) illustrating the side view of the third row seat 3. In this case, as shown in FIG. 8(b) showing a cross-sectional view taken along the line C—C in FIG. 8(a), the headrest 33 is accommodated in the depression 323 formed in the back surface of the seat back 32, thereby reducing the thickness measured from the lower surface of the seat cushion 31 to the upper surface of the headrest 33. The depression 323 is dimensioned so as not to protrude beyond the seat back frame 322 towards the seating surface, thereby assuring the cushion thickness on the side of the seating surface and thus favorable seating comfort.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A seat storing structure for a vehicle comprising:
 a seat including a seat cushion provided on a floor in a passenger compartment of the vehicle, a seat back supported by a rear portion of said seat cushion, and a headrest supported by said seat back, and constructed so as to selectively attain a seating state where said seat back is erected in the vicinity of the rear portion of said seat cushion or folded state where said seat back is folded down forward onto said seat cushion;

a pivotally supporting mechanism provided between said seat and the floor for supporting said seat and pivoting the seat rearward with said seat maintaining the folded state; and a recess formed in the floor behind said seat for storing said seat such that a surface of said seat cushion is substantial alignment with the floor after said seat has been pivoted rearward with said seat maintaining the folded state, wherein said headrest is supported by said seat back so as to shift between a first state where said headrest is located at the top of said seat back with said seat in the seating state, and a second state where said headrest is located on a back surface of said seat back and within paths of pivotal motions of said seat back and seat cushions with said seat maintaining the folded state, and wherein a silencer is provided beneath the floor, the silencer having an elliptic-cylindrical shape and disposed in front of the recess such that its longitudinal direction is oriented substantially in the width direction of the vehicle and the major axis of an ellipsoid as its cross-section is oriented substantially in the vertical direction of the vehicle.

2. The seat storing structure for a vehicle as defined in claim 1, wherein the floor is slanted such that its rear portion is situated higher than its front portion.

* * * * *